(12) United States Patent
Sugawara

(10) Patent No.: US 12,450,391 B1
(45) Date of Patent: Oct. 21, 2025

(54) VIDEO PROVISION SYSTEM, VIDEO PROVISION METHOD, AND NON-TRANSITORY COMPUTER-READABLE MEDIUM

(71) Applicant: Safie Inc., Tokyo (JP)

(72) Inventor: Hiroaki Sugawara, Tokyo (JP)

(73) Assignee: Safie Inc., Tokyo (JP)

( * ) Notice: Subject to any disclaimer, the term of this patent is extended or adjusted under 35 U.S.C. 154(b) by 0 days.

(21) Appl. No.: 19/092,702

(22) Filed: Mar. 27, 2025

(30) Foreign Application Priority Data

Apr. 6, 2024 (JP) ................ 2024-061810

(51) Int. Cl.
  *G06T 5/70* (2024.01)
  *G06F 16/732* (2019.01)
  *G06F 21/62* (2013.01)

(52) U.S. Cl.
  CPC ........ *G06F 21/6245* (2013.01); *G06F 16/732* (2019.01); *G06T 5/70* (2024.01)

(58) Field of Classification Search
  CPC .............. G06F 21/6245; G06F 16/732; G06F 21/6254; G06F 16/78867; G06F 17/18; G06F 18/214; G06F 18/22; G06F 18/241; G06F 18/24; G06F 18/2411; G06F 18/2415; G06F 30/27; G06T 5/70; G06T 2207/30232; G06T 7/20; G06T 2207/10016; G06T 2207/10021;
  (Continued)

(56) References Cited

U.S. PATENT DOCUMENTS 11,423,175 B1 * 8/2022 Mahajan .............. G06V 40/172
2016/0286156 A1 9/2016 Kovac
(Continued)

FOREIGN PATENT DOCUMENTS

JP 2014-067131 A 4/2014
JP 2018-205835 A 12/2018
(Continued)

OTHER PUBLICATIONS

Office Action issued in JP 2024-061810; mailed by the Japanese Patent Office on May 14, 2024.
(Continued)

*Primary Examiner* — Jose L Couso
(74) *Attorney, Agent, or Firm* — Studebaker Brackett PLLC

(57) ABSTRACT

A video provision system is configured to: display a setting screen on a first device to allow a user to select at least one type of masking processing to be executed from a plurality of masking processing types, wherein the plurality of masking processing types include deep masking processing and at least one of blurring processing and mosaic processing, and wherein the deep masking processing removes personal information of a person in a first video while preserving attribute information of the person, including gender, age, and facial expression; determine the at least one type of masking processing to be executed, in response to user input via the setting screen; execute the determined type of masking processing on the person in the first video to generate a second video; store the second video on the server; and provide the second video from the server to a second device.

14 Claims, 15 Drawing Sheets

(58) Field of Classification Search
CPC ............. G06T 2207/30221; G06T 5/75; G06T 3/4046; G06T 5/60; G06T 9/002; G06T 2207/20076; G06T 2207/20081; G06T 2207/20084; G06V 20/52; G06V 20/46; G06V 40/172; G06V 40/174; G06V 10/758; G06V 10/764; G06V 10/7715; G06V 40/178; G06V 40/179; G06V 10/454; G06V 10/54; G06V 10/774; G06V 10/82; G06V 20/41; G06V 30/18057; G06V 20/698; G06V 30/19173; H04N 7/18; H04N 5/772; H04N 5/262; H04N 5/77; H04N 9/8205; H04N 21/23418; H04N 21/25875; H04N 21/44218; H04N 21/45455; H04N 21/2347; H04N 21/235; H04N 21/4318; H04N 21/4405; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; Y10S 128/925

See application file for complete search history.

(56) References Cited

U.S. PATENT DOCUMENTS

| | | | |
|---|---|---|---|
| 2020/0012362 A1* | 1/2020 | Kim | G06F 3/041 |
| 2020/0250401 A1* | 8/2020 | Kaneishi | G06T 5/70 |
| 2022/0012362 A1* | 1/2022 | Kuta | G06V 10/758 |
| 2024/0046424 A1* | 2/2024 | Takahashi | G06T 3/4053 |
| 2024/0320371 A1* | 9/2024 | Maeda | G06V 40/161 |

FOREIGN PATENT DOCUMENTS

| | | | | | |
|---|---|---|---|---|---|
| JP | 2019-079357 | A | | 5/2019 | |
| JP | 2020-068425 | A | | 4/2020 | |
| JP | 2020-141246 | A | | 9/2020 | |
| JP | 2021-027384 | A | | 2/2021 | |
| JP | 2022-016132 | A | | 1/2022 | |
| KR | 101626546 | B1 | * | 6/2016 | ............. H04N 7/181 |
| KR | 102302041 | B1 | * | 9/2021 | ....... H04N 21/23476 |
| KR | 20220160215 | A | * | 12/2022 | ............... H04N 7/18 |
| KR | 102622523 | B1 | * | 1/2024 | ........... G06T 3/4038 |
| WO | 2023/002661 | A1 | | 1/2023 | |

OTHER PUBLICATIONS

Office Action issued in JP 2024-061810; mailed by the Japanese Patent Office on Jul. 23, 2024.

Office Action issued in JP 2024-061810; mailed by the Japanese Patent Office on Aug. 27, 2024.

* cited by examiner

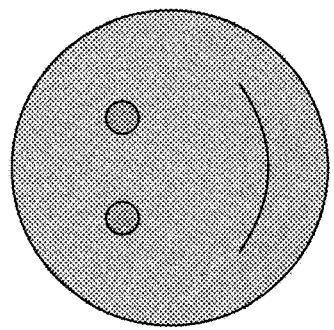
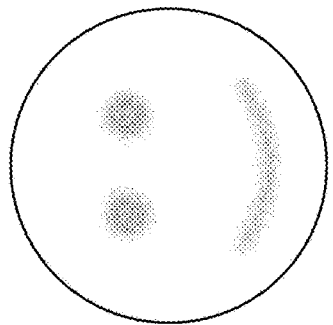
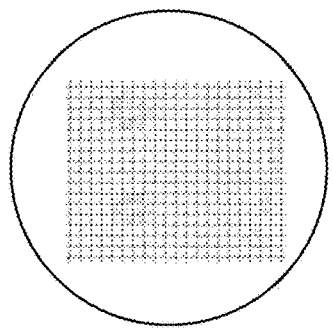
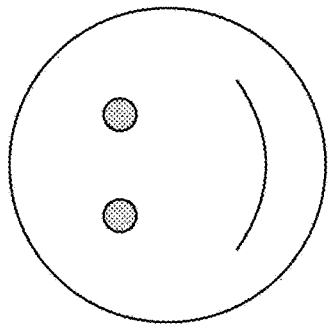

FIG. 8A — Original Face
FIG. 8B — Face After Mosaic Processing
FIG. 8C — Face After Blurring Processing
FIG. 8D — Face After Deep Masking Processing

| | FIG. 8A | FIG. 8B | FIG. 8C | FIG. 8D |
|---|---|---|---|---|
| Personal Information | × Not Protected | ○ Protected | ○ Protected | ○ Protected |
| AI Recognition | ○ Recognizable as a Person | × Not Recognizable as a Person | ○ Recognizable as a Person | ○ Recognizable as a Person |
| Example of Attribute Judgment by AI | ○ Age: 30-35 Years Old<br>○ Gender: Men<br>○ Mask Wearing: None | × Age: Unknown<br>× Gender: Unknown<br>× Mask Wearing: Unknown | ○ Age: Unknown<br>○ Gender: Unknown<br>○ Mask Wearing: Unknown | ○ Age: 30-35 Years Old<br>○ Gender: Men<br>○ Mask Wearing: None |

FIG. 9

List of Masking Tasks

| Task Name | Registration Date and Time | Processing Result | Masking Evaluation | Video data Name |
|---|---|---|---|---|
| Store A Masking Data | 2023.12.25 15:00 | Normal Completion | Evaluate | Store A Data (Deleted) |
| Store B Masking Data | 2023.12.25 17:00 | Normal Completion | OK (Approve) | Store B Data |
| Store C Masking Data | 2023.12.25 19:00 | Error | — | Store C Data |
| Store D Masking Data | 2023.12.25 21:00 | Normal Completion | NG (Reject) | Store D Data |

FIG. 12A

Video Management Data

| Video Data ID | Video Duration | Data Size | Masking Processing Type | Object Type | Capture Location | Business Type |
|---|---|---|---|---|---|---|
| | (A) | (B) | (C) | (D) | (E) | (F) |
| 1212 | 30 min | 500MB | Deep Masking Processing | Person | Indoor | Retail (Convenience Store) |
| 1213 | 60min | 1GB | Blurring Processing | Vehicle (Passenger Car) | Outdoor | Construction Site (Road) |
| 1214 | 15 min | 250MB | Mosaic Processing | Person | Indoor | Dining (Restaurant) |
| ⋮ | ⋮ | ⋮ | ⋮ | ⋮ | ⋮ | ⋮ |

FIG. 12B

| Region | Time Period | Metadata Usage Permission | Metadata ID |
|---|---|---|---|
| Shinagawa, Tokyo | Daytime | Allowed | 1112 |
| Yokohama, Kanagawa | Nighttime | Not Allowed | — |
| Paris, France | Morning | Allowed | 1113 |
| ... | ... | ... | ... |

FIG. 13

| | Search Conditions for Video Data | |
|---|---|---|
| Video Duration | ☐ minutes or more | ☐ minutes or less |
| Data Size | ☐ MB or more | ☐ MB or less |
| Masking Processing Type | ☐ Deep Masking Processing | ☐ Blurring Processing ☐ Mosaic Processing |
| Object Type in Video | ☐ Person<br>☐ Vehicle ( ☐ Passenger Car  ☐ Bicycle  ☐ Motorcycle  ☐ Special Vehicle ) | |
| Capture Location | ☐ Indoor | ☐ Outdoor |
| Business Type of Location Where Video Was Captured | ☐ Dining ( ☐ Izakaya  ☐ Restaurant )<br>☐ Retail ( ☐ Convenience Store  ☐ Supermarket  ☐ Department Store )<br>☐ Construction Site ( ☐ Building  ☐ House  ☐ Road ) | |
| Region Where Video Was Captured | ☐ Domestic   Select Prefecture ▼ | Select City ▼ |
| | ☐ Overseas   Select Country ▼ | Select City ▼ |
| Time Period When Image Was Captured | ☐ Daytime  ☐ Nighttime  ☐ Early Morning  ☐ Evening | |
| Metadata Usage Preference | ☐ Metadata Usage Requested | |

[ Send ] — 105

VIDEO PROVISION SYSTEM, VIDEO PROVISION METHOD, AND NON-TRANSITORY COMPUTER-READABLE MEDIUM

This application claims priority from Japanese Patent Application No. 2024-061810, filed on Apr. 6, 2024, the entire contents of which are hereby incorporated by reference.

BACKGROUND

Technical Field

The present disclosure relates generally to a video provision system, a video provision method, and a non-transitory computer-readable medium.

Background Art

With the advancement of artificial intelligence (AI) technology, the demand for training data necessary for constructing machine learning models has been increasing. Particularly, in order to build highly accurate machine learning models, such as those utilizing machine learning for image recognition, a large volume of training data is required. In this regard, a video provision system equipped with cameras, a server, and user devices accumulates a vast amount of video data on the server daily. Thus, it is conceivable to effectively utilize the stored video data as training data. However, video data that can be used as training data may contain personal information such as human faces and vehicle license plates. In order to comply with privacy protection laws and other regulations, it is necessary to remove such personal information from the video data before utilizing it as training data.

Japanese Patent Application Publication No. JP2018-205835A discloses an image processing technology that identifies face regions within video data and applies mosaic processing (a type of masking processing) to the identified face regions.

According to the disclosure of JP2018-205835A, personal information can be removed from the video data by applying mosaic processing to the face regions within the video data, so that it is possible to use the video data after mosaic processing as training data. However, existing video provision systems equipped with cameras, a server, and user devices lack effective mechanisms for efficiently utilizing video data stored on the server as training data. In particular, there is room for consideration of new mechanisms to improve usability of the video provision system in the context of the masking processing performed on video data.

SUMMARY

The present disclosure mainly aims to improve the usability of a video provision system in the context of masking processing applied to video data.

According to one or more aspects of the present disclosure, there is provided a video provision system which stores video captured by a camera on a server and provides the video to a device. The system configured to: display a setting screen on a first device to allow a user to select at least one type of masking processing to be executed from a plurality of masking processing types, wherein the plurality of masking processing types include deep masking processing and at least one of blurring processing and mosaic processing, and wherein the deep masking processing removes personal information of a person in a first video while preserving attribute information of the person, including gender, age, and facial expression; determine the at least one type of masking processing to be executed, in response to user input the setting screen; execute the determined type of masking processing on the person in the first video to generate a second video; store the second video on the server; and provide the second video from the server to a second device.

According to one or more aspects of the present disclosure, there is provided a video provision system which stores video captured by a camera on a server and provides the video to a device. The system configured to: execute masking processing on a person in a first video to generate a second video; store the second video on the server; display a search screen on a second device to allow a user to search for a desired second video from a plurality of the second videos, wherein the search screen allows setting of at least one type of masking processing as a search condition from a plurality of masking processing types, wherein the plurality of masking processing types include deep masking processing, and wherein the deep masking processing removes personal information of a person in the first video while preserving attribute information of the person, including gender, age, and facial expression; determine search conditions for the second video in response to user input via the search screen; retrieve at least one second video that satisfies the determined search conditions from the second videos stored on the server; and provide the retrieved second video to the second device.

According to one or more aspects of the present disclosure, there is provided a video provision method executed by a video provision system. The video provision system is configured to store video captured by a camera on a server and provide the video to a device. The method comprises: displaying a setting screen on a first device to allow a user to select at least one type of masking processing to be executed from a plurality of masking processing types, wherein the plurality of masking processing types include deep masking processing and at least one of blurring processing and mosaic processing, and wherein the deep masking processing removes personal information of a person in a first video while preserving attribute information of the person, including gender, age, and facial expression; determining the at least one type of masking processing to be executed, in response to user input via the setting screen; executing the determined type of masking processing on the person in the first video to generate a second video; storing the second video on the server; and providing the second video from the server to a second device.

BRIEF DESCRIPTION OF THE DRAWINGS

For a better understanding of the nature and objects of an embodiment of the present disclosure, reference should be made to the following detailed description taken in conjunction with the accompanying drawings, in which:

FIG. 8A illustrates an original face before masking processing.

FIG. 8B illustrates an example of mosaic processing.

FIG. 8C illustrates an example of blurring processing.

FIG. 8D illustrates an example of deep masking processing.

FIG. 9 illustrates an example of a masking task list screen.

FIG. 12A illustrates portions of video management data.

FIG. 12B illustrates the remaining portions of video management data.

FIG. 13 illustrates an example of a video search screen.

DETAILED DESCRIPTION

Overview of the Embodiment

Figure 1:
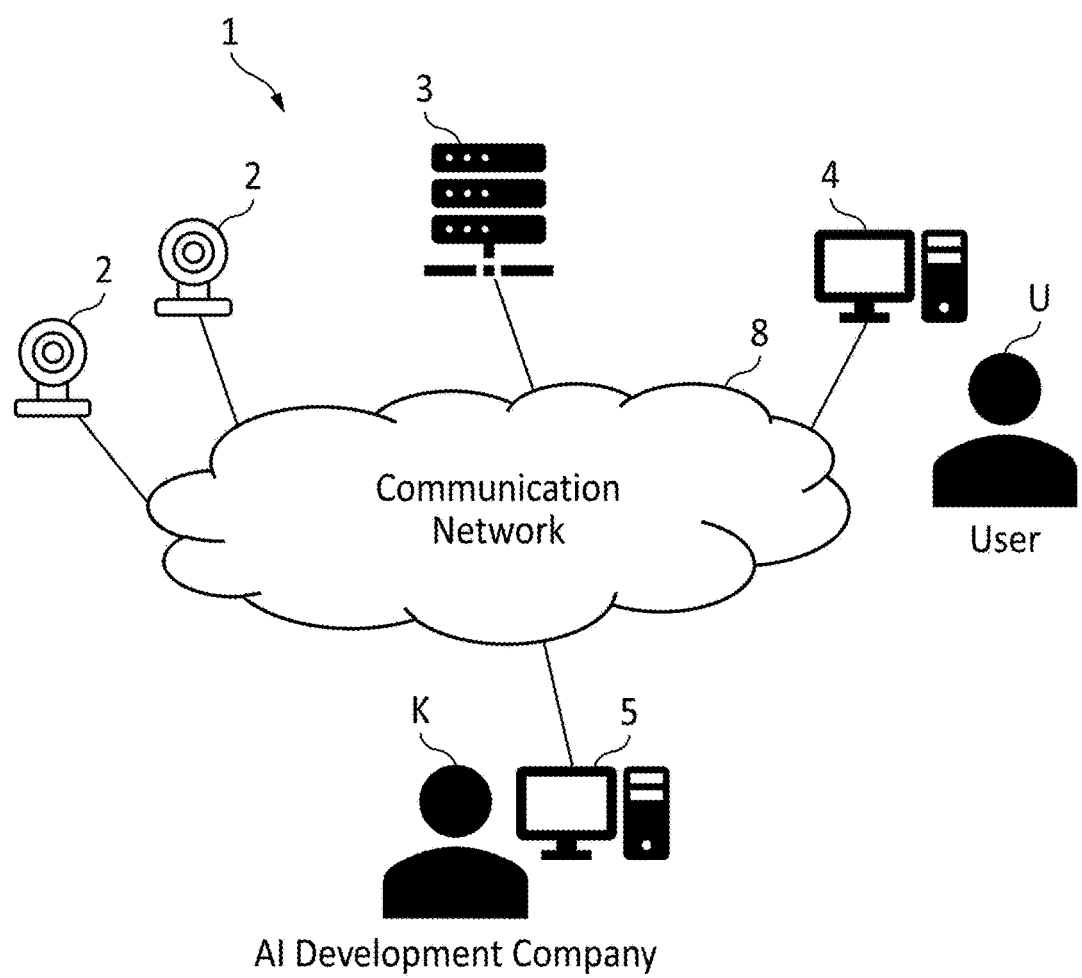
FIG. 1 illustrates a video provision system according to an embodiment of the present disclosure.

A video provision system according to an aspect of the present disclosure is a system that stores video captured by a camera on a server and provides the video to devices. The system is configured to display a setting screen for masking processing to be executed on a first device; determine a type of masking processing in response to user input via the setting screen; execute the determined type of masking processing on an object with personal information in a first video to generate a second video; store the second video on the server; and provide the second video from the server to a second device.

With this configuration, the setting screen for setting the masking processing (anonymization of personal information) is displayed on the first device, and the type of masking processing is determined in response to user input via the setting screen. The determined type of masking processing is executed on an object (e.g., a person, vehicle or the like) with personal information in the first video. Then, the second video is then provided to the second device. This allows a user to determine, via the setting screen, which type of masking processing should be applied to the first video, thereby improving the usability of the video provision system in the context of masking processing applied to the video. Moreover, by providing the second video to the second device, the video data stored in the server can be effectively utilized. For instance, it is possible to effectively use the video after masking processing as training data for constructing machine learning models (video recognition models using machine learning).

The video provision system may be further configured to display a confirmation screen on the first device to verify whether the masking processing has been properly executed in the second video, determine whether the second video is available for use in response to user input via the confirmation screen; and store the second video on the server in response to determining that the second video is available for use.

According to the above configuration, the confirmation screen is displayed on the first device, and the availability of the second video is determined in response to user input via the confirmation screen. In this manner, the user can ascertain whether the masking process has been appropriately executed on the second video via the confirmation screen, thereby enhancing the usability of the video provision system in the context of video masking processing applied to the video. Furthermore, since the user can objectively verify that appropriate masking processing, in compliance with regulations such as the Personal Information Protection Act, has been performed on the video, sufficient transparency and reliability regarding the masking process can be ensured. As a result, third parties who receive the masked video can utilize the masked video with confidence. Additionally, since the masked video is provided to the second device, the video stored on the server can be effectively utilized. For example, the masked video can be effectively utilized as training data for constructing a machine learning model (an image recognition model utilizing machine learning).

The video provision system may be further configured to display the first video and the second video side by side on the confirmation screen.

According to this configuration, the user can clearly ascertain whether the masking process has been appropriately executed on the second video via the confirmation screen where the first and second videos are displayed side by side.

The video provision system may be further configured to delete the first video after storing the second video.

According to this configuration, since the first video is deleted after storing the second video, the data storage capacity accumulated within the server can be optimally controlled, and the maintenance cost of the server can be suitably reduced.

The video provision system may be further configured to acquire attribute information of the object and provide the attribute information and the second video.

According to this configuration, the attribute information and the second video are provided to the second device. Thus, even if the attribute of the object cannot be identified from the second video (for example, when mosaic processing or blurring processing has been applied to the second video), the attribute information allows the identification of the attribute of the object. Thus, the masked video can be effectively utilized as training data for constructing a machine learning model.

The object may be a person. The attribute information may include at least one of gender, age, face angle, and facial expression.

According to this configuration, even if the attribute of a person included in the second video cannot be identified, the attribute of the person can be identified through attribute information that includes at least one of gender, age, face angle, and facial expression. In this manner, the masked video can be effectively utilized as training data for constructing a machine learning model related to human motion.

Metadata associated with the second video may be stored. The metadata may include at least one of an identifier of the video, a capturing time of the video, a capture location of the video, and the type of masking process executed on the video.

According to this configuration, the searchability of the second video stored on the server can be improved through metadata that includes at least one of the identifier of the video, the capturing time of the video, the capture location of the video, and the type of masking process executed on the video.

The video provision system may be further configured to display a search screen on the second device to search for a desired second video from a plurality of second videos, determine search conditions in response to user input via the search screen, retrieve at least one second video that satisfies the determined search conditions from the second videos stored on the server, and provide the retrieved second video to the second device.

According to this configuration, the desired second video that matches the search conditions can be provided to the second device from the plurality of second videos stored on the server.

The search conditions may include at least one of video duration, video data size, type of masking process executed on the video, type of the object included in the video, location where the video was captured, business type of location where the video was captured, region where the video was captured, time period when the video was captured, and metadata associated with the video.

According to this configuration, the operator of the second device can obtain the desired second video that matches at least one of these pieces of information.

The setting screen may include a masking process selection area that allows the selection of at least one type of masking processing among plural types of masking processing. The plural types of masking processing may include a first masking process, which makes both the attribute information and personal information of the object unidentifiable, and a second masking process, which makes the personal information unidentifiable while allowing the attribute information to be identified.

According to this configuration, the setting screen having the masking process selection area is displayed on the first device, and the masking process is determined in response to user input operations via the setting screen. In this manner, since the user can determine through the setting screen whether to execute the first masking process (e.g., mosaic processing or blurring processing) or the second masking process (e.g., deep masking processing) on the first video, the usability of the video provision system in the context of video masking processing can be enhanced.

A video provision system according to another aspect of the present disclosure is a system which stores video captured by a camera on a server and provides the video to a device. The system is configured to execute masking processing on an object with personal information included in a first video to generate a second video. The system is configured to display a confirmation screen on the first device to verify whether the masking processing has been appropriately executed on the second video. In response to user input via the confirmation screen, the availability of the second video is determined. In response to determining that the second video is available for use, the system is configured to store the second video on the server and provide the second video to a second device.

According to this configuration, the confirmation screen is displayed on the first device, and in response to user input via the confirmation screen, the availability of the second video is determined. This allows the user to confirm whether the masking processing has been properly executed on the second video through the confirmation screen, thereby improving the usability of the video provision system in the context of video masking processing. Furthermore, since the user can objectively verify that appropriate masking processing has been executed on the video in compliance with laws such as the Personal Information Protection Act, transparency and reliability regarding the masking process can be sufficiently ensured. As a result, third parties receiving the masked video can use it with confidence. Additionally, since the masked video is provided to the second device, the video stored on the server can be effectively utilized. For example, the masked video can be effectively used as training data for constructing a machine learning model (such as an image recognition model using machine learning).

A video provision system according to another aspect of the present disclosure is a system which stores video captured by a camera on a server and provides the video to a device. The system is configured to execute masking processing on an object with personal information included in the first video to generate a second video. The system is configured to store the second video on the server, and display a search screen on the second device to allow a user to search for a desired second video from a plurality of second videos. The system is configured to determine search conditions for the second video in response to user input via the search screen. The system is configured to retrieve at least one second video that satisfies the determined search conditions from the plurality of second videos stored on the server and provide the retrieved second video to the second device.

According to this configuration, the system can provide the desired second video that meets the search conditions from among the multiple second videos stored on the server, thereby improving the usability of the video provision system in the context of video searchability.

A video provision method according to an aspect of the present disclosure is executed by a video provision system that stores video captured by a camera on a server and provides the video to a device. The method includes: displaying a setting screen for masking processing to be executed on a first device; determining a type of masking processing in response to user input via the setting screen; executing the determined type of masking processing on an object with personal information in the first video to generate a second video; storing the second video on the server; and providing the second video from the server to the second device.

Additionally, there is provided a video provision program that causes a video provision system to execute the video provision method and a non-transitory computer-readable medium storing the video provision program.

(System Configuration)

Next, the video provision system 1 according to the embodiment will be described with reference to the drawings. FIG. 1 illustrates the video provision system 1 according to the embodiment. As shown in FIG. 1, the video provision system 1 includes cameras 2, a server 3, a user device 4, and an enterprise device 5. These components are connected via a communication network 8. Each of the cameras 2 is communicably connected to the server 3 via the communication network 8. In this example, two cameras 2 are illustrated; however, the number of cameras 2 provided in the video provision system 1 is not particularly limited and may be three or more. The server 3 is communicably connected to the user device 4 and the enterprise device 5 via the communication network 8. The communication network 8 includes at least one of a LAN (Local Area Network), WAN (Wide Area Network), the Internet, or a wireless core network. In this embodiment, for convenience of explanation, one server 3, one user device 4, and one enterprise device 5 are illustrated, but the number of these components is not particularly limited.

(Configuration of Camera 2)

Figure 2:
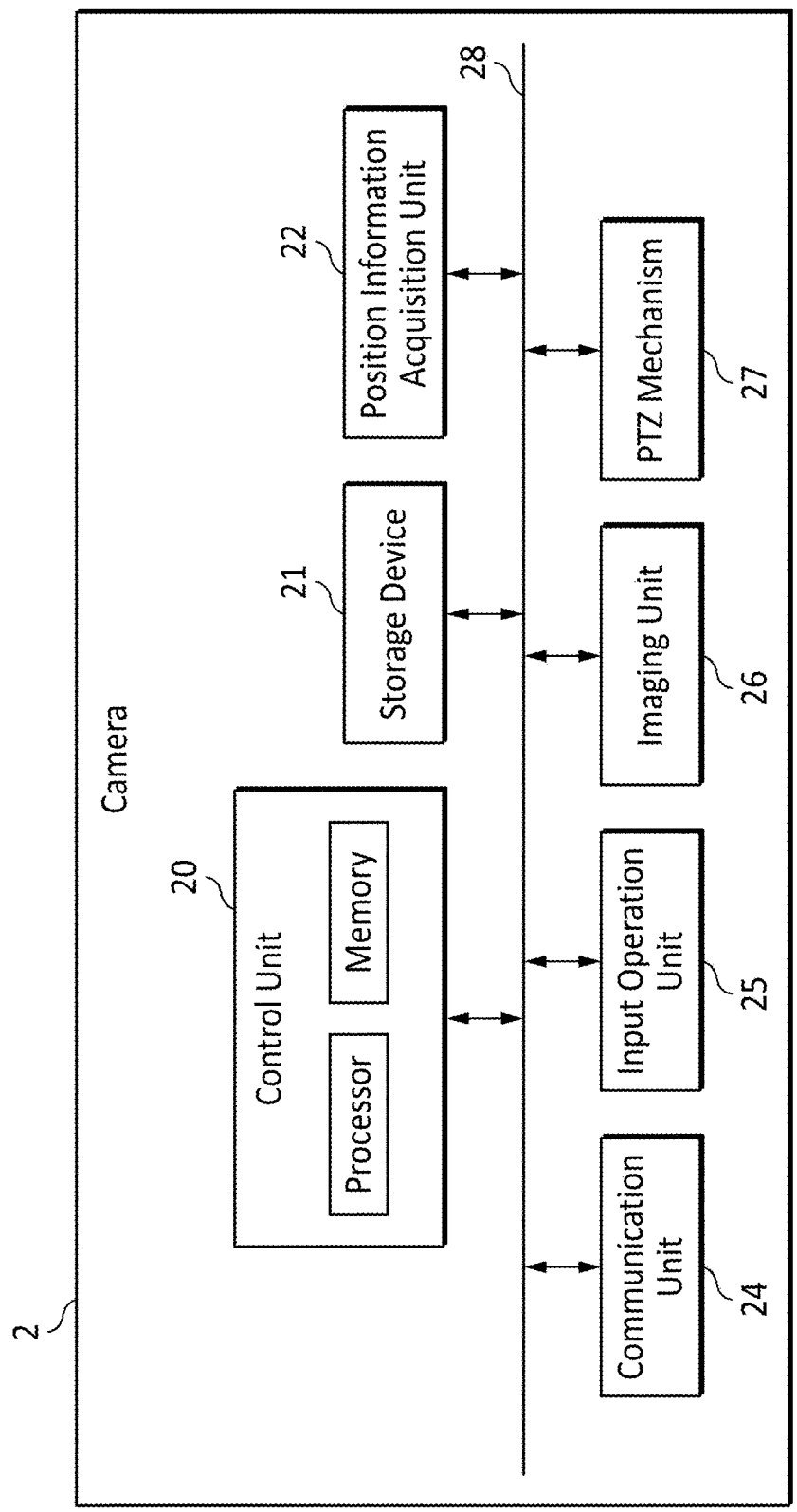
FIG. 2 illustrates an example hardware configuration of a camera.

Next, the hardware configuration of the camera 2 will be described. FIG. 2 illustrates an example of the hardware configuration of the camera 2. The camera 2 is configured to capture video data indicating its surrounding environment and may be installed inside or around a store such as a convenience store or a restaurant. As shown in FIG. 2, the camera 2 includes a control unit 20, a storage device 21, a position information acquisition unit 22, a communication unit 24, an input operation unit 25, an imaging unit 26, and a PTZ mechanism 27. These components are connected via a communication bus 28. The camera 2 may also include a built-in battery (not shown). Furthermore, the camera 2 may be equipped with a microphone and speaker.

The control unit 20 includes memory and a processor. The memory is configured to store computer-readable instructions (programs). For example, the memory consists of ROM (Read-Only Memory) storing various programs and RAM (Random Access Memory) having multiple work areas for executing programs by the processor. The processor may include at least one of a CPU (Central Processing Unit), MPU (Micro Processing Unit), or GPU (Graphics Processing Unit). The CPU may include multiple CPU cores, and the GPU may include multiple GPU cores. The processor may expand a designated program from various programs stored in the storage device 21 or ROM to RAM and execute various processing tasks in cooperation with RAM.

The storage device 21 is a storage device such as an HDD (Hard Disk Drive), SSD (Solid State Drive), or flash memory, and is configured to store programs and various data. The position information acquisition unit 22 acquires the position information (longitude, latitude) of the camera 2 and may be, for example, a GPS (Global Positioning System) receiver.

The communication unit 24 is configured to connect the camera 2 to the communication network 8. The communication unit 24 includes a wireless communication module for wirelessly communicating with external devices such as a base station or a wireless LAN router. The wireless communication module includes a transmission/reception antenna and a signal processing circuit. The wireless communication module may support short-range wireless communication standards such as Wi-Fi (registered trademark) or Bluetooth (registered trademark) and may also be a wireless communication module supporting an Xth generation mobile communication system (such as LTE, a 4G/5G mobile communication system) using a SIM (Subscriber Identity Module).

The input operation unit 25 is configured to receive user input operations and generate an operation signal corresponding to the user input. The imaging unit 26 is configured to capture the surrounding environment of the camera 2. Specifically, imaging unit 26 is configured to generate a video signal indicating the surrounding environment of the camera 2 and includes an optical system, an image sensor, and an analog processing circuit. The optical system includes, for example, an optical lens and a color filter. The image sensor may be composed of CCD (Charge-Coupled Device) or CMOS (Complementary Metal-Oxide Semiconductor). The analog processing circuit is configured to process the video signal (analog signal) photoelectrically converted by the image sensor and includes, for example, an amplifier and an AD converter.

The PTZ mechanism 27 includes a pan mechanism, a tilt mechanism, and a zoom mechanism. The pan mechanism is configured to change the horizontal orientation of the camera 2. The tilt mechanism is configured to change the vertical orientation of the camera 2. The zoom mechanism is configured to change the angle of view of the camera 2 to enlarge (zoom in) or reduce (zoom out) the image of a captured object. The zoom mechanism may change the angle of view of the camera 2 optically by changing the focal length of the optical lens included in the imaging unit 26 or digitally. In this embodiment, in response to the user input operation performed on the user device 4, a control signal instructing the camera 2 to pan, tilt, and/or zoom is transmitted from the user device 4 to the camera 2 via the server 3. In this case, the control unit 20 drives the PTZ mechanism 27 according to the received control signal, thereby enabling real-time execution of the pan, tilt, and zoom functions of the camera 2. In this way, the PTZ function of the camera 2 can be controlled remotely through the user device 4.

The camera 2 can transmit a real-time video stream indicating its surrounding environment to the server 3 via the communication network 8.

(Server Configuration)

Figure 3:
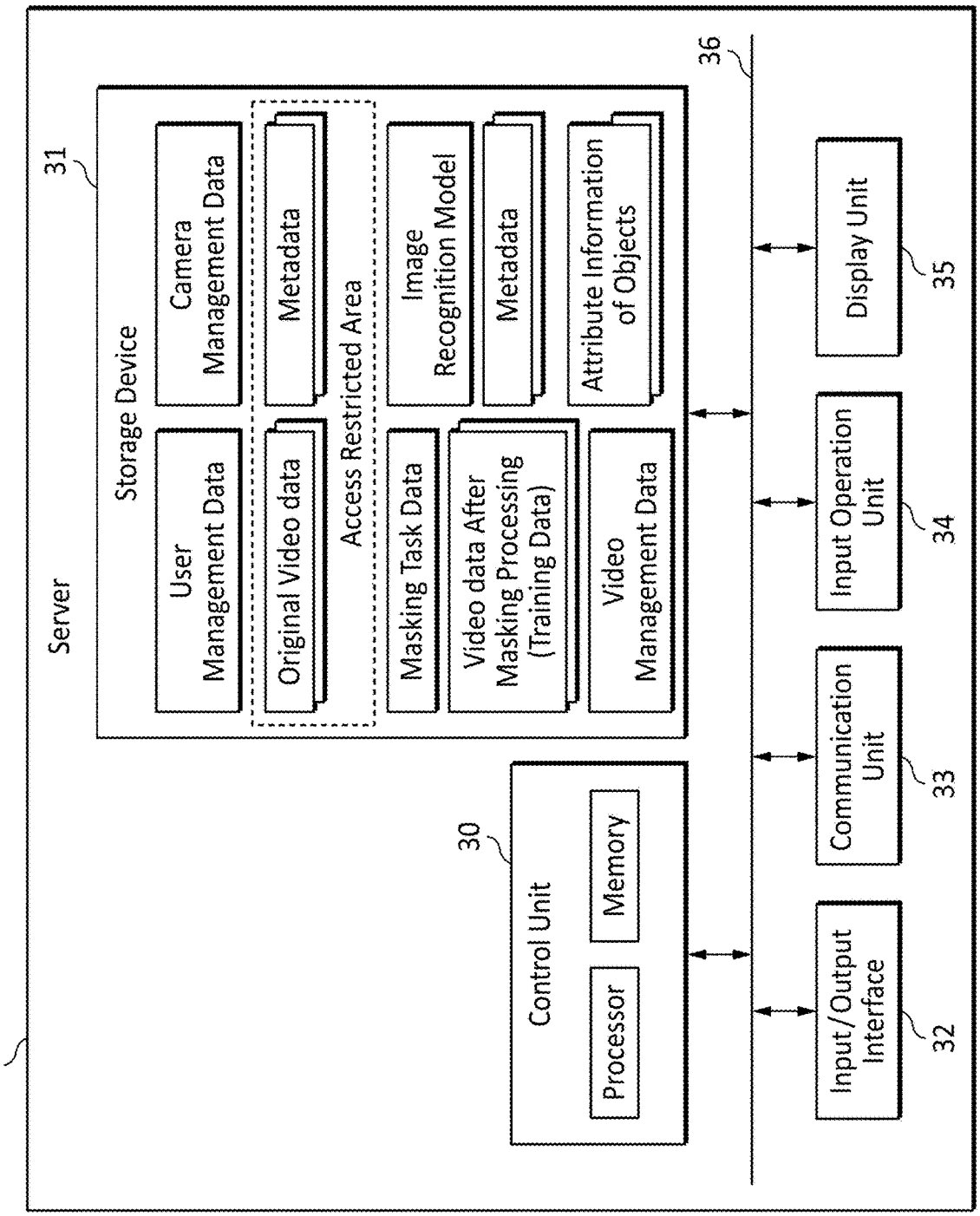
FIG. 3 illustrates an example hardware configuration of a server.

Next, the hardware configuration of the server 3 will be described. FIG. 3 illustrates an example of the hardware configuration of the server 3. The server 3 is configured to receive video data from the cameras 2 via the communication network 8 and transmit the video data to the user device 4 in response to a video transmission request from the user device 4. The server 3 may include multiple servers. The server 3 functions as a web server that provides a cloud-based video distribution application as a web application. In this regard, the server 3 is configured to transmit data (e.g., HTML files, CSS files, image/video files, program files, etc.) for displaying the video display screen 50 (see FIG. 6) on the web browser of the user device 4. In this way, the server 3 functions as a server that provides SaaS (System as a Service). The server 3 may be built on-premises or may be a cloud server.

As shown in FIG. 3, the server 3 may include a control unit 30, a storage device 31, an input/output interface 32, a communication unit 33, an input operation unit 34, and a display unit 35. These components are connected via a communication bus 36.

The control unit 30 includes memory and a processor. The memory is configured to store computer-readable instructions. Specifically, the memory may store a program that allows the processor to execute a series of processes performed by the server 3. The memory may include ROM and RAM. The processor may include at least one of a CPU (Central Processing Unit), MPU (Micro Processing Unit), or GPU (Graphics Processing Unit).

The storage device 31 is a storage device such as an HDD (Hard Disk Drive), SSD (Solid State Drive), or flash memory, and is configured to store programs and various data. The storage device 31 stores user management data and camera management data. Additionally, the storage device 31 stores original video data (video data before masking processing), metadata associated with the original video data, masking task data, and an image recognition model (trained model). Furthermore, the storage device 31 stores video data after masking processing (training data), metadata associated with the masked video data, and attribute information indicating the attributes of each object (e.g., people, vehicles, etc.) included in the video data. Additionally, the storage device 31 stores video management data (video management table) for managing multiple video data files after masking processing.

The user management data includes management information for each user U who uses the video provision system 1. The camera management data includes management information for each camera 2. Since the original video data includes personal information such as human faces and vehicle license plates, access to the video data from external sources is restricted to comply with personal information protection laws. In this regard, even the operator of the video provision system 1 is restricted from accessing the original video data, and only users U who operate stores where the cameras 2 are installed (e.g., store managers who own the cameras 2 or store employees authorized by the owner to access the videos of the cameras 2) can access the video data. Multiple video data files captured by multiple cameras 2 are stored in the storage device 31, and each original video data file may be deleted from the storage device 31 after a predetermined period.

The metadata associated with the original video data may include a series of information for managing the video data. This management information may include, for example, video data identification information, capturing time information, capture location information, user information, and camera information. The masking task data includes information related to masking processing tasks (see FIG. 9). Masking processing refers to the process of removing personal information included in video data. The types and details of masking processing will be described later.

The image recognition model is a trained model constructed using machine learning. The algorithm used for the image recognition model may include neural networks, among others. The image recognition model may include multiple image recognition models of different types. The image recognition model is constructed using training data that associates image data with information about objects included in the image data (e.g., people, vehicles, etc.). The training data is prepared through annotation (tagging) of image data. The information about objects may include the object type, attributes, and location.

For example, if the object type is a person, the information about the object may include data indicating that the object is a person, attribute information about the person, and face region information indicating the position of the person's face. The face region information may be identified by the coordinates of two diagonal vertices of four vertices forming a rectangular region surrounding the face. The attribute information about a person may include gender, age, presence or absence of a mask, face angle, and facial expression. If the object type is a vehicle (e.g., car, motorcycle, etc.), the information about the object may include data indicating that the object is a vehicle, attribute information about the vehicle, and license plate region information indicating the position of the vehicle's license plate.

When video data containing multiple objects is input into an image recognition model, the model may output information indicating the type, attributes, and location of each object included in the frames constituting the video data. For example, if video data containing multiple people is input into the image recognition model, the model may output attribute information for each person (such as gender, age, presence or absence of a mask, face angle, and facial expression) and face region information. Additionally, if video data containing multiple vehicles is input into the image recognition model, the model may output license plate region information for each vehicle.

In the masked video data (video data after masking processing), personal information included in the video data has been removed through the masking process. Therefore, access to the masked video data from the outside is not restricted. In this way, AI development company K, which develops artificial intelligence (AI), can utilize the masked video data as training data for constructing a machine learning model (such as an image recognition model using machine learning). Metadata associated with the masked video data may include a set of information related to the masked video data (such as video data identification information, capturing time information, capture location information, and masking processing details). Since masked video data is used as training data, the metadata includes information that enhances the searchability of video data.

When the object included in the video data is a person, the attribute information of the object may include at least one of gender information, age information, face angle information, or facial expression information. In this regard, the control unit 30 may acquire the attribute information of each object included in the video data by using an image recognition model stored in the storage device 31. The attribute information obtained through the image recognition model is stored in the storage device 31 in association with the masked video data. Specifically, each object included in the video data is assigned identification information, and the identification information and attribute information of each object may be associated with each other.

The input/output interface 32 is an interface that enables connection between external devices and the server 3 and may include interfaces conforming to certain communication standards such as USB or HDMI (registered trademark). The communication unit 33 may include various wired communication modules for communicating with external devices on the communication network 8. The input operation unit 34 is, for example, a touch panel, mouse, and/or keyboard configured to receive input operations from an operator and generate an operation signal according to the input operation. The display unit 35 may include a video display and a video display circuit.

(Configuration of User Device 4)

Figure 4:
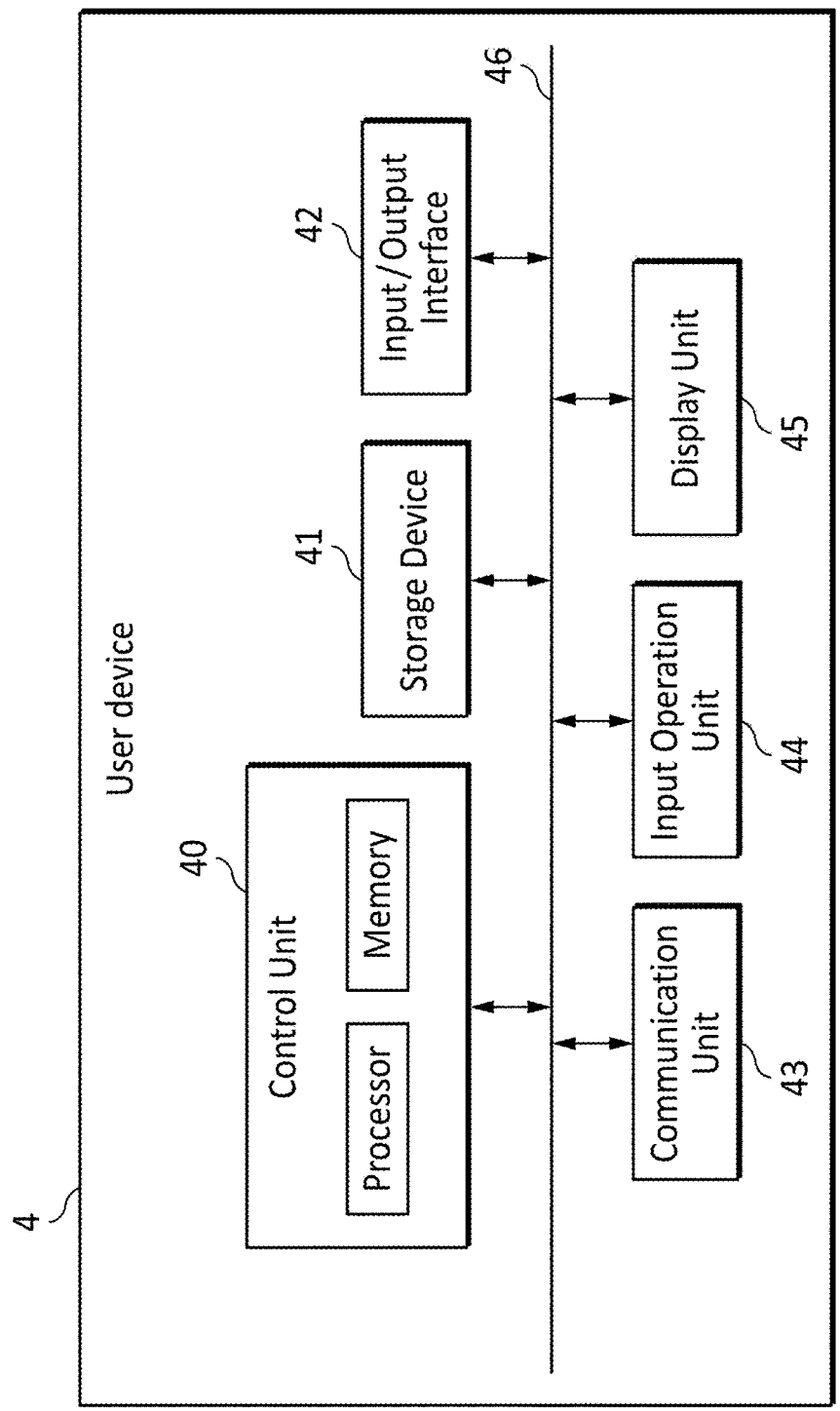
FIG. 4 illustrates an example hardware configuration of a user device.

Next, the configuration of the user device 4 (an example of a first device) will be described. FIG. 4 illustrates an example of the hardware configuration of the user device 4. As shown in FIG. 1, the user device 4 is operated by the user U, who manages a store where the cameras 2 are installed. The user device 4 is communicably connected to the server 3 via the communication network 8. The user device 4 may be a personal computer, smartphone, tablet, or a wearable device worn by the user U. The user device 4 may include a web browser. The video distribution application provided by the server 3 operates on the web browser of the user device 4. Note that if the user device 4 is a smartphone or tablet, the video distribution application may operate on software downloaded to the user device 4 instead of a web browser.

As shown in FIG. 4, the user device 4 includes a control unit 40, a storage device 41, an input/output interface 42, a communication unit 43, an input operation unit 44, and a display unit 45. These components are connected via a communication bus 46. The user device 4 can access data stored in the storage device 31 of the server 3, provided that the video was captured by a camera 2 owned by that user. In this case, the user can access both the masked video data and the access-restricted area data. However, for videos captured by cameras owned by other users, the user can access only the masked video data but not the access-restricted area data.

The control unit 40 includes memory and a processor. The memory is configured to store computer-readable instructions. Specifically, the memory may store a program that allows the processor to execute a series of processes performed by the user device 4. The memory consists of ROM and RAM. The processor may include at least one of a CPU (Central Processing Unit), MPU (Micro Processing Unit), or GPU (Graphics Processing Unit). The storage device 41 is a storage device such as an HDD (Hard Disk Drive), SSD (Solid State Drive), or flash memory, and is configured to store programs and various data.

The input/output interface 42 is an interface that enables connection between external devices and the user device 4. The communication unit 43 is configured to connect the user device 4 to the communication network 8. The communication unit 43 includes a wireless communication module and a wired communication module for wirelessly communicating with external devices such as base stations or wireless LAN routers. The input operation unit 44 is, for example, a touch panel overlaid on the video display of the display unit 45, a mouse, and/or a keyboard. The input operation unit 44 is configured to receive input operations from the user U and generate an operation signal according to the input operation. The display unit 45 may include a video display and a video display circuit that drives and controls the video display.

(Configuration of Enterprise Device 5)

As shown in FIG. 1, the enterprise device 5 (an example of a second device) is a device operated by the AI development company K. The enterprise device 5 may be a personal computer, smartphone, tablet, or a wearable device worn by a staff member of the AI development company K. The hardware configuration of the enterprise device 5 may be the same as that of the user device 4. The enterprise device 5 is communicably connected to the server 3 via the communication network 8. The enterprise device 5 can access masked video data that is stored in the storage device 31 of the server 3 and captured by the cameras 2 owned by various users. However, the enterprise device 5 cannot access video data in the access-restricted area.

(Sequence of Processes Executed by the Video Provision System 1)

Figure 5A:
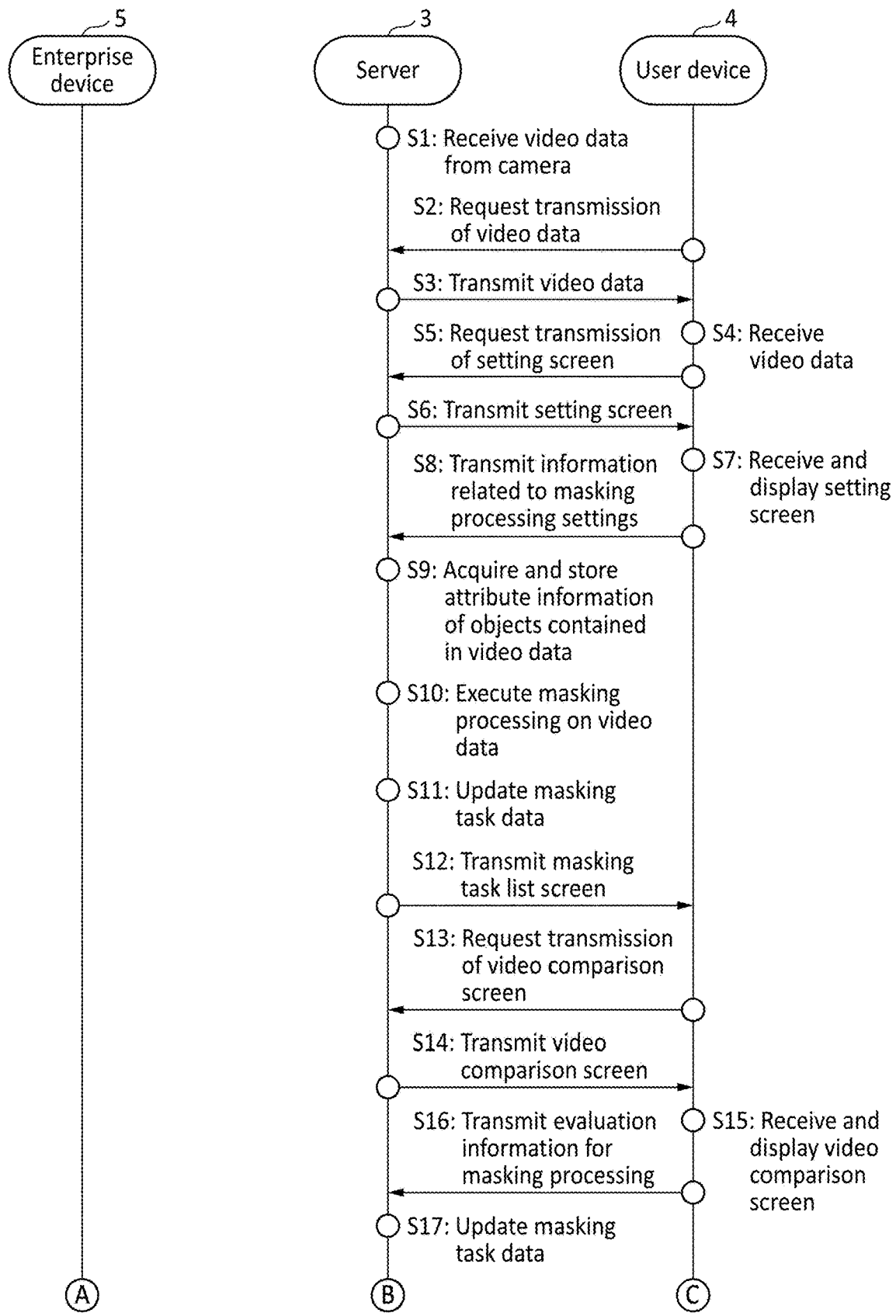
FIG. 5A and FIG. 5B are flowcharts explaining a series of processes executed by the video provision system.
Figure 5B:
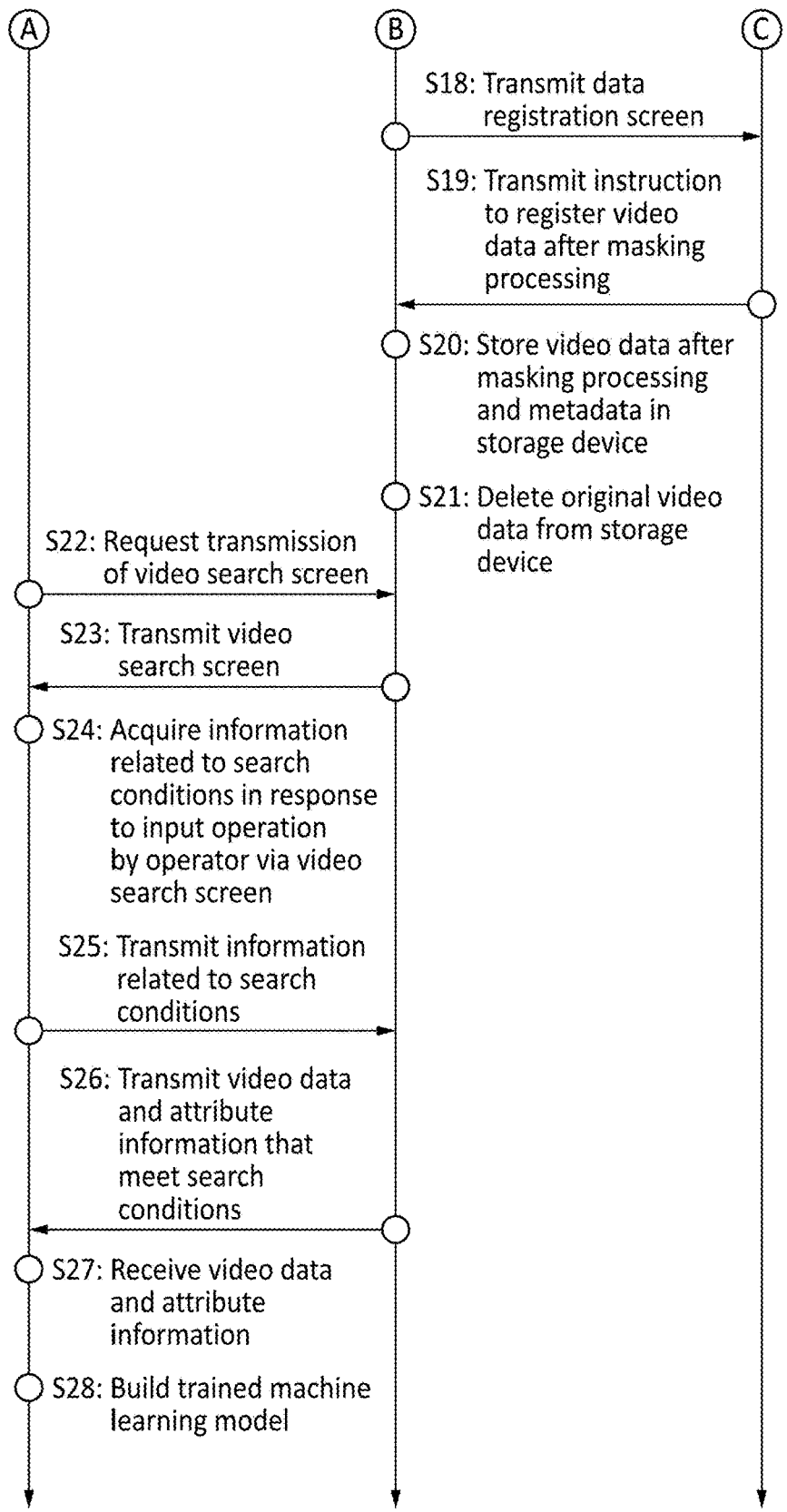

Next, referring to FIG. 5, the sequence of processes executed by the video provision system 1 according to this embodiment will be described. FIG. 5 is a flowchart illustrating the sequence of processes executed by the video provision system 1. As shown in FIG. 5, in step S1, the server 3 receives video data from each camera 2 via the communication network 8 and stores the received video data (original video data) in the storage device 31. In step S2, the server 3 receives a video data transmission request from the user device 4. In step S3, the server 3 transmits the video data to the user device 4 in response to the transmission request from the user device 4. Specifically, the server 3 transmits data (HTML files, CSS files, image/video files, program files, etc.) necessary for displaying the video display screen 50 (see FIG. 6) on the user device 4. Subsequently, the video display screen 50 is displayed on the web browser of the user device 4 (step S4).

Figure 6:
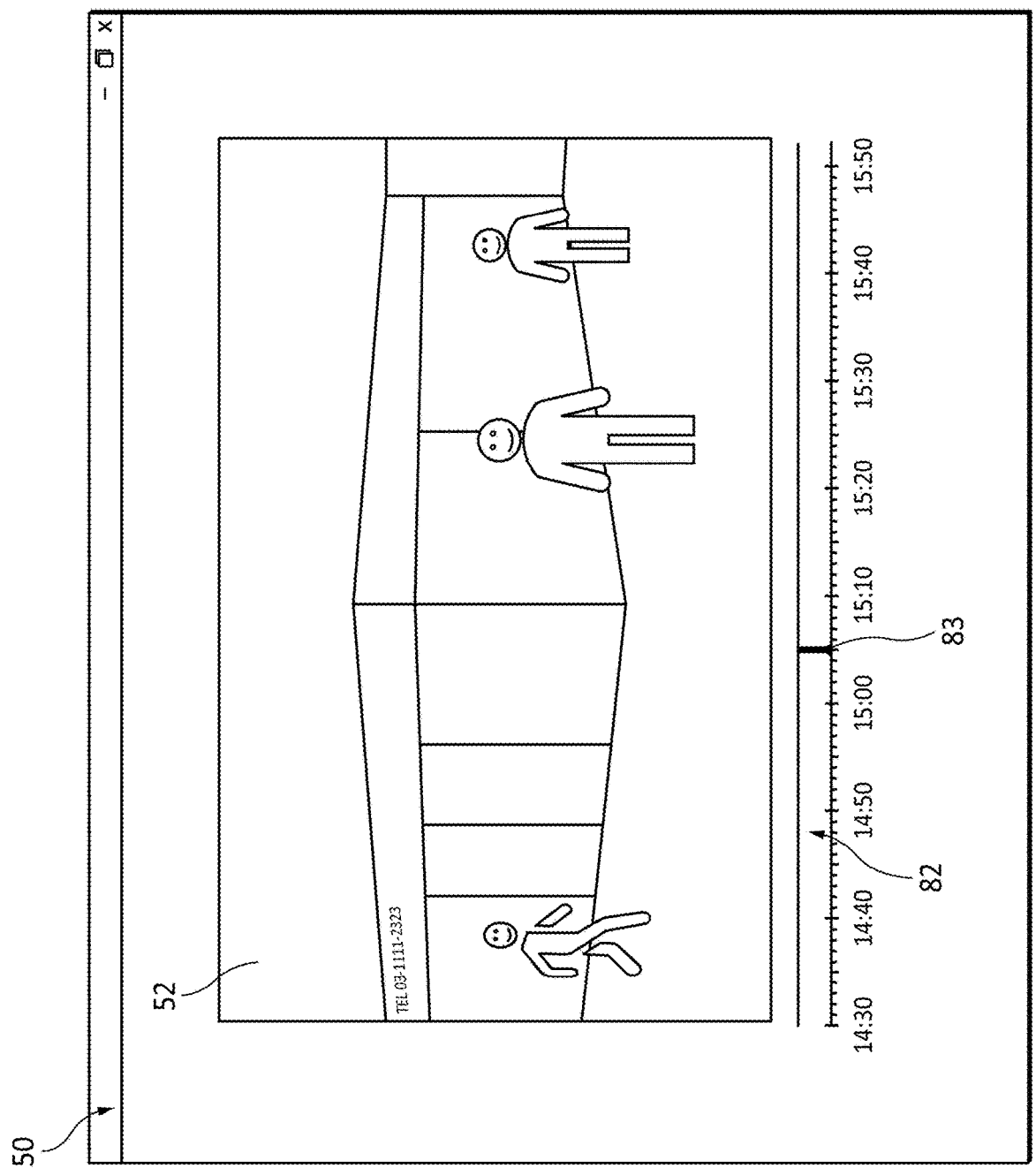
FIG. 6 illustrates an example of a video display screen on a user device.

As shown in FIG. 6, the video display screen 50 includes a video display area 52 where video data is displayed, a timeline 82 indicating playback time, and a slider 83 that can be moved along the timeline 82. This type of screen is called a viewer. The user U can change the playback time of the video data by moving the slider 83 on the timeline 82 of the viewer. For example, when the user U moves the slider 83 to the position of 15:00, the user device 4 transmits a request to the server 3 to receive video data for the time range around 15:00. In response to this transmission request, the server 3 sends video data for the time range around 15:00 to the user device 4. Consequently, the video data for the time range around 15:00 is displayed in the video display area 52. In addition to specifying time, the user may also specify date information using a calendar or similar interface. Additionally, by specifying a start and end point on the timeline 82, the user may extract a section of the video and create a movie clip.

Next, the user device 4 transmits a request to the server 3 to display the setting screen 60 (see FIG. 7) related to the masking process settings for the video data, based on the input operations performed by the user U (Step S5). The server 3, in response to the request from the user device 4, transmits the data necessary to display the setting screen 60 to the user device 4 (Step S6). The user device 4 then receives this data and displays the setting screen 60 on the web browser (Step S7).

Figure 7:
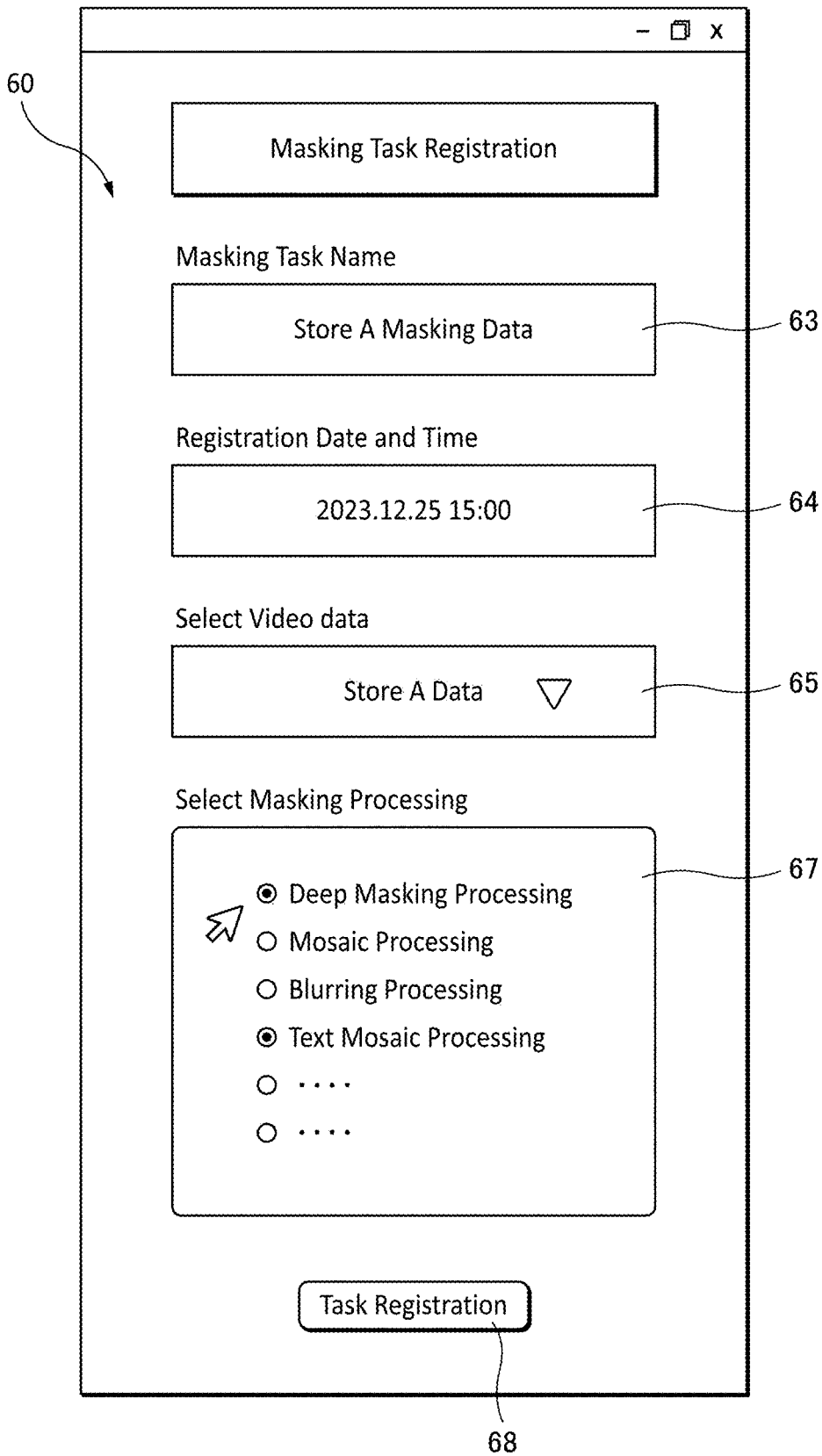
FIG. 7 illustrates an example of a setting screen displayed on a user device.

As shown in FIG. 7, the setting screen 60 is a screen for setting masking processing, specifically for registering a masking task. The setting screen 60 includes a masking task name input area 63, a registration date display area 64, a video data selection area 65, a masking process selection area 67, and a task registration button 68. The masking task name can be entered in the masking task name input area 63. The registration date display area 64 shows the date and time when the masking task was registered. The video data selection area 65 allows the user to select the video data on which the masking process will be executed. For example, if multiple cameras 2 associated with the user U have captured video data from stores A, B, C, and D, the video data selection area 65 allows the user to select the video data from any of these stores.

Additionally, the storage device 31 of the server 3 stores continuous video data for a predetermined number of days for the stores A to D. To specify which video data should be subjected to masking processing, the setting screen 60 may also include a store selection area (not shown) for selecting the store where the video was captured, a camera selection area (not shown) for selecting the camera that captured the video, and a period selection area (not shown) for specifying the time period of the video. In this case, when a camera is selected in the camera selection area, the screen shown in FIG. 6 is displayed, and the movie clip function mentioned earlier can be used to specify the desired time range. Furthermore, when a camera is selected in the camera selection area, a list of previously created movie clips using the camera data may be displayed, allowing the user to select a desired video clip. Additionally, before selecting a camera, the user may first select a store in the store selection area, narrowing down the available cameras displayed in the camera selection area to those from the selected store.

The masking process selection area 67 allows the user to select a masking process to be executed on an object with personal information (e.g., a human face) in the video data. As shown in FIG. 7, examples of masking processes that can be selected in the masking process selection area 67 include deep masking processing, mosaic processing, blurring processing, and text mosaic processing. In this example, the user U can choose one masking process from deep masking processing, mosaic processing, or blurring processing in the masking process selection area 67. Additionally, the user U can optionally select text mosaic processing as an additional masking process.

Next, the different types of masking processing will be explained with reference to FIGS. 8A to 8D. Note that the information in FIGS. 8A to 8D may also be displayed as help information in areas such as the masking process selection area 67. As shown in FIG. 8A, the original face before masking processing (an example of an object) retains personal information. Additionally, before masking processing, the face can be recognized as a person by AI (image recognition model) and its attributes can be identified by AI.

Examples of attribute information include age, gender, presence or absence of a mask, face angle, and facial expression, though the types of attributes are not limited to these.

As shown in FIG. 8B, after mosaic processing, the face cannot be used to identify personal information. Additionally, after mosaic processing, the face cannot be recognized as a person by AI, nor can its attributes be identified by AI. In this way, mosaic processing (an example of first masking processing) removes not only personal information but also information about the type and attributes of the object.

As shown in FIG. 8C, after blurring processing, the face cannot be used to identify personal information. However, after blurring processing, the face can still be recognized as a person by AI, but its attributes cannot be identified by AI. In this way, blurring processing (an example of second masking processing) removes personal information as well as attribute information of the object. However, blurring processing does not remove information about the object type.

As shown in FIG. 8D, after deep masking processing, the face cannot be used to identify personal information. However, after deep masking processing, the face can still be recognized as a person by AI, and its attributes can be identified by AI. In this way, deep masking processing (an example of third masking processing) removes personal information while retaining information about the type and attributes of the object. Specifically, when the object is a person, deep masking processing removes personal information of the person while preserving attributes of the person such as age, gender, and facial expression.

As described above, the amount of information removed from the video data about the object increases in the following order: "mosaic processing">"blurring processing">"deep masking processing". If the user U considers it acceptable for the attribute information of people in the masked video data to be used for machine learning, they will likely select deep masking processing via the masking process selection area 67. On the other hand, if the user U does not want facial attribute information to be used for machine learning, they will likely select mosaic processing or blurring processing via the masking process selection area 67.

Text mosaic processing is executed on character information corresponding to personal information. For example, since vehicle identification information displayed on a vehicle license plate corresponds to personal information, mosaic processing is performed on this vehicle identification information. In such cases, the user's approach to selecting a type of masking processing is similar to that for human faces.

Returning to FIG. 5, in step S8, the user device 4 transmits a series of information related to masking processing settings to the server 3 in response to the user's input operation on the setting screen 60 displayed on the display unit 45 (specifically, the user's operation on the task registration button 68). More specifically, the series of information may include the masking task name, registration date and time, selection of video data, and selection of masking processing type.

Next, the server 3 (specifically, the control unit 30 of the server 3) determines the target video data for masking processing and the type of masking processing to be applied, based on the series of information related to masking processing settings received from the user device 4. The server 3 then acquires and stores attribute information of each object (particularly, people) with personal information included in the target video data (step S9). More specifically, the server 3 may use an image recognition model to acquire the attribute information of each object included in the video data and stores the acquired attribute information in the storage device 31.

In step S10, the server 3 executes masking processing on the selected target video data. For example, if the user U has selected deep masking processing, the server 3 executes deep masking processing on each object with personal information included in the video data. More specifically, the server 3 uses an image recognition model to identify face region information and attribute information of each person included in each frame of the video data. Then, based on the identified face region information and attribute information, the server 3 performs deep masking processing on the person's face indicating personal information. If the user U has selected mosaic processing or blurring processing, the server 3 executes mosaic processing or blurring processing on each object with personal information included in the video data. More specifically, the server 3 identifies face region information of each person included in each frame of the video data using an image recognition model. Then, based on the identified face region information, the server 3 performs mosaic processing or blurring processing on the person's face indicating personal information. These masking processes are executed on a copy of the original video data. After processing is completed, the original video data may either be deleted or retained.

After executing masking processing on the video data, the server 3 updates the masking task data stored in the storage device 31 (step S11). As shown in FIG. 9, the masking task data includes information related to the masking processing tasks. Specifically, the masking task data may include information about the masking task name, registration date and time of the masking task, masking processing result, evaluation of masking processing, and the name of the video data on which masking processing was executed. After executing masking processing on the video data, the server 3 registers information related to the masking processing task in the masking task data. For example, if the masking processing is completed successfully, the masking task data is updated to indicate that the processing has been successfully completed. If the masking processing fails, the masking task data is updated to indicate an error.

In step S12, based on the updated masking task data, the server 3 generates the masking task list screen 70 (see FIG. 9) and transmits data for displaying the masking task list screen 70 (including HTML files, CSS files, image/video files, and program files) to the user device 4. Subsequently, the masking task list screen 70 is displayed on the web browser of the user device 4.

As shown in FIG. 9, the masking task list screen 70 displays various pieces of information related to masking processing tasks. Specifically, the masking task list screen 70 may display information about the masking task name, registration date and time of masking task, masking processing result, evaluation of masking processing, and the name of the video data on which masking processing was executed. Additionally, other information (not shown), such as the store designated in the store selection area, the camera designated in the camera selection area, and the period specified in the period selection area, may also be displayed on the masking task list screen 70.

The evaluation information related to masking processing may include assessment data indicating whether masking processing has been appropriately executed for each object in the video data. More specifically, the evaluation information may include data indicating whether the masking processing has been appropriately executed ("approval") or not appropriately executed ("rejection"). Additionally, if masking processing for a specific video data file has not yet been evaluated, an evaluation button 72 may be displayed in association with the corresponding video data on the masking task list screen 70. In the example shown in FIG. 9, since the masking processing for the video data of store A has not yet been evaluated, the evaluation button 72 is displayed in association with the video data of store A.

In step S13, the user device 4 sends a request for transmitting the video comparison screen 80 (see FIG. 10) to the server 3 in response to user input on the user device 4. Specifically, when the user U operates the evaluation button 72 displayed on the masking task list screen 70, the user device 4 sends a request for transmitting the video comparison screen 80 to the server 3. The server 3 transmits data for displaying the video comparison screen 80 to the user device 4 in response to the request from the user device 4 (step S14). The user device 4 then receives the data and displays the video comparison screen 80 on the web browser (step S15).

Figure 10:
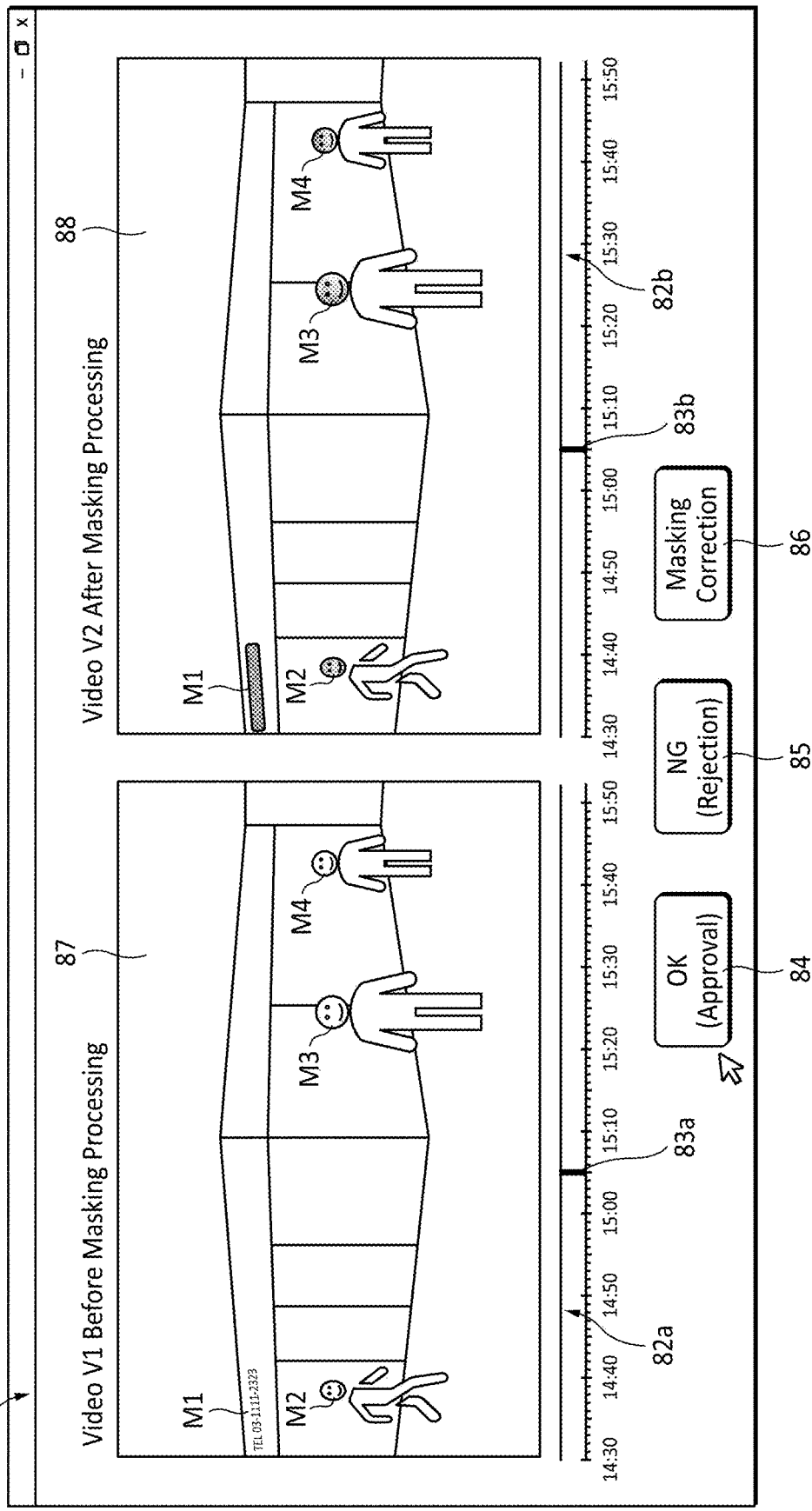
FIG. 10 illustrates an example of a video comparison screen on the user device.

As shown in FIG. 10, the masked video data V2 (e.g., video data of store A after masking processing) and the video data V1 before masking processing (e.g., video data of store A before masking processing) are displayed side by side on the video comparison screen 80 (an example of a video confirmation screen). The video comparison screen 80 includes a video display area 87 for displaying the video data V1 before masking processing and a video display area 88 for displaying the video data V2 after masking processing. The video display areas 87 and 88 are arranged side by side. The video comparison screen 80 includes timeline 82*a* and slider 83*a* associated with the video display area 87, as well as timeline 82*b* and slider 83*b* associated with the video display area 88. The video data V1 and V2 may be played in sync (time-synchronized playback). In this case, the timeline 82*a* and timeline 82*b*, as well as the slider 83*a* and slider 83*b*, may be synchronized. Alternatively, a single set of timeline and slider may be displayed for both video data V1 and V2.

In the example shown in FIG. 10, the video data V1 before masking processing displayed in the video display area 87 contains objects M1 to M4 with personal information. The object M1 represents character-based personal information, while objects M2 to M4 are humans (especially, human faces). In the masked video data V2 displayed in the video display area 88, text mosaic processing has been applied to the object M1, while deep masking processing has been applied to the human faces M2 to M4.

Additionally, the video comparison screen 80 includes an approval button 84 indicating approval of the masking process, a rejection button 85 indicating disapproval of the masking process, and a masking correction button 86. In step S16, the user device 4 transmits evaluation information regarding the masking process to the server 3 in response to user input on the user device 4. The evaluation information indicates whether the masking process has been appropriately executed for each object included in the video data. For example, if the user U operates the approval button 84, the user device 4 transmits evaluation information indicating whether the masking process has been appropriately executed (indicating approval of the masking process) to the server 3. In the meanwhile, if the user U operates the rejection button 85, the user device 4 transmits evaluation information indicating whether the masking process has not been appropriately executed (indicating rejection of the masking process) to the server 3. For example, if the masking process has not been appropriately executed for the face region of the object, the user U may determine that the masking process has not been appropriately executed for the object included in the video data.

In step S17, the server 3 determines whether the masking process has been appropriately executed for each object included in the video data based on the evaluation information received from the user device 4. The server 3 also updates the masking task data accordingly. Specifically, the server 3 updates the evaluation information related to the masking process included in the masking task data based on the received evaluation information. If the server 3 receives evaluation information indicating that the masking process has been appropriately executed, the server 3 determines that the masking process has been properly executed for each object included in the video data and updates the masking task data. The server 3 then transmits data for displaying the data registration screen 90 (see FIG. 11) to the user device 4 (step S18). Subsequently, the user device 4 receives the data for displaying the data registration screen 90 and displays the data registration screen 90 on the web browser.

If the server 3 receives evaluation information indicating that the masking process has not been appropriately executed, the server 3 determines that the masking process has not been properly executed for each object included in the video data and updates the masking task data accordingly. The server 3 may then execute the masking process on the video data again. Additionally, the user U may operate the masking correction button 86 and then use the input operation unit 44 (e.g., mouse operations) to modify the masking process applied to the masked video data V2. For example, on the masked video data V2 as shown in FIG. 10, the user U may select M1 to M4 to exclude them from masking or select other faces or text areas to include them as masked objects. Furthermore, a user interface may be displayed to allow the user to select the type of masking process, thereby enabling the user to change the masking type by selecting one of multiple masking types. In this case, the user device 4 transmits information regarding the user's modifications to the masking process to the server 3. The server 3 then updates the masked video data based on the modification information received from the user device 4. The server 3 may subsequently transmit data for displaying the data registration screen 90 to the user device 4.

Figure 11:
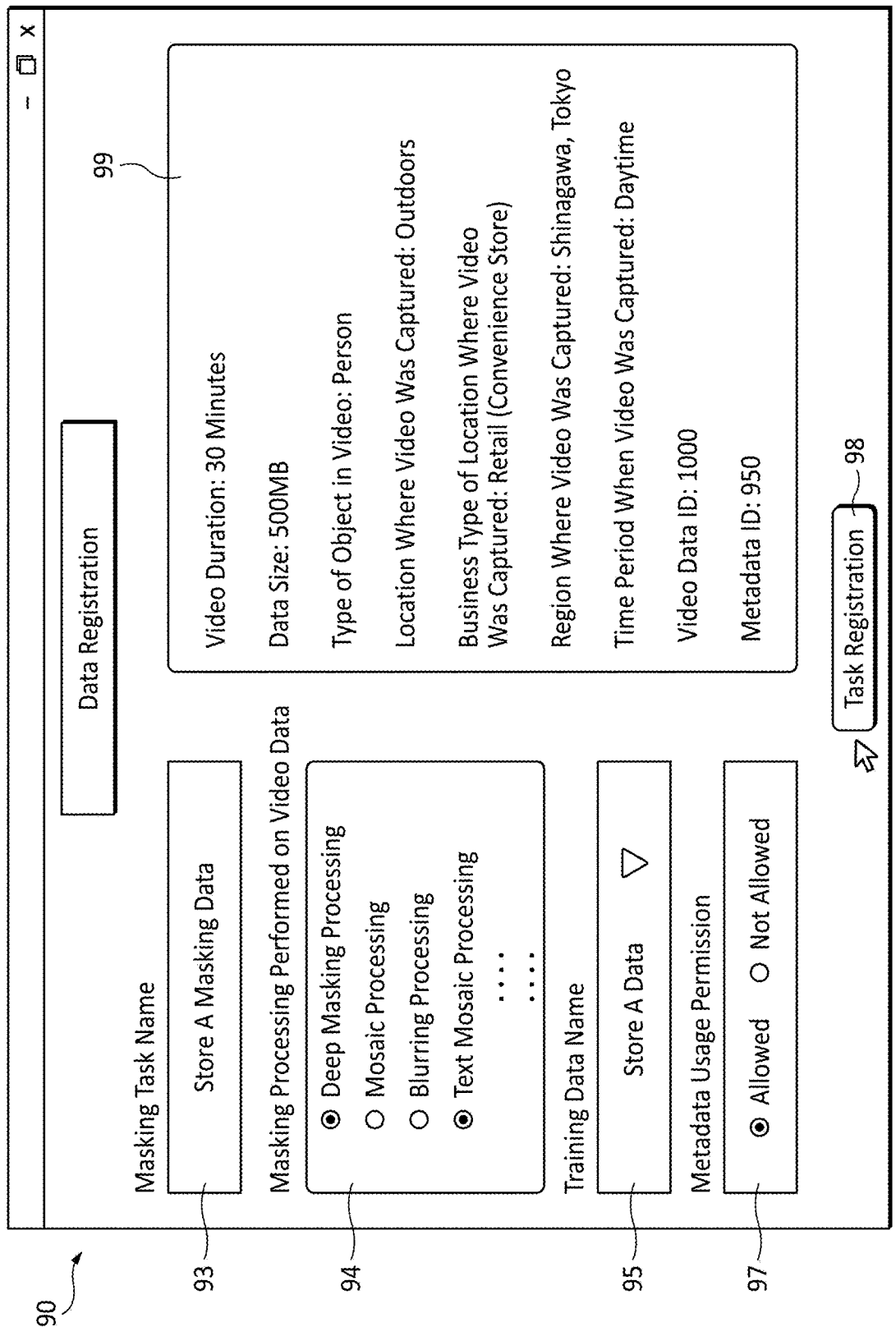
FIG. 11 illustrates an example of a data registration screen on the user device.

As shown in FIG. 11, the data registration screen 90 is a screen for registering the masked video data. The data registration screen 90 includes a masking task name display area 93, a masking process display area 94, a video data name display area 95, a metadata usage permission selection area 97, a video-related information display area 99, and a data registration button 98. The masking task name display area 93 displays the masking task name. The masking process display area 94 displays information regarding the masking process applied to the video data. If deep masking processing and text mosaic processing have been applied to the video data, both deep masking processing and text mosaic processing are initially selected in the masking process display area 94. The user U can modify and/or add masking process types through input operations on the masking process display area 94. The video data name display area 95 displays information about the video data name. Additionally, other information (not shown) such as the store designated in the store selection area, the camera designated in the camera selection area, and the period specified in the period selection area may also be displayed on the data registration screen 90.

The metadata usage permission selection area 97 allows the user U to determine whether third parties (in this case, the AI development company K) can use the metadata associated with the video data. The user U can decide whether to permit the use of metadata associated with the video data by making selections in the metadata usage permission selection area 97.

The video-related information display area 99 displays information such as the video capturing time, video data size, type of objects included in the video, location where the video was captured, business type of location where the video was captured, region where the video was captured, time zone when the video was captured, video data ID, and metadata ID associated with the video data.

The information regarding the type of objects may indicate whether the object is a person or a vehicle (such as a passenger car, bicycle, motorcycle, or specialized vehicle). The location information may indicate whether the capturing location was indoors or outdoors. The business type information may indicate whether the business type is related to dining (e.g., izakaya, restaurant), retail (e.g., convenience store, supermarket, department store), or construction sites (e.g., buildings, detached houses, roads). The region information may indicate the country, prefecture, or city where the video was captured. If the video was captured in Japan, the region information may specify the prefecture and city. If the video is captured in a foreign country, the region information may specify the country and city. The time zone information may indicate whether the video was captured during the day, night, early morning, or evening. These pieces of information may be set based on predefined camera settings or extracted through analysis of the video data.

Returning to FIG. 5, in step S19, the user device 4 transmits information indicating an instruction to register the masked video data to the server 3 in response to the user input via the data registration screen 90 (specifically, user input via the data registration button 98). The information indicating the instruction to register the video data may include information regarding the selected masking processing in the masking process display area 94 (in this example, deep masking processing and text mosaic processing) and information regarding metadata usage permission (in this example, information indicating that metadata usage is permitted). The server 3 then stores the masked video data and metadata in the storage device 31 in response to the registration instruction from the user device 4 (step S20). Since the original video data (video data before masking processing) contains personal information, access to the original video data is restricted for third parties other than the user U. However, since the masked video data does not contain personal information, access to the masked video data is not restricted for third parties (in this example, the AI development company K). Additionally, the server 3 updates the video management data (video management table) to manage the multiple video data stored in the storage device 31 (see FIGS. 12A and 12B).

As shown in FIGS. 12A and 12B, the video management data includes the video data ID, video capturing time, video data size, type of objects included in the video, location where the video was captured, business type where the video was captured, region where the video was captured, time zone when the video was captured, metadata usage permission status, and metadata ID. The video management data is split between FIGS. 12A and 12B, wherein FIG. 12A illustrates a portion of the video management data and FIG. 12B illustrates the remaining portion.

The metadata associated with the masked video data may include at least one of video data identification information, video capturing time information, video capture location information, and information related to the masking process executed on the video data. The presence of metadata enhances the searchability of the masked video data. When multiple masked video data files are stored in the storage device 31, multiple metadata files may also be stored in the storage device 31, with each metadata file associated with a corresponding masked video data file.

Additionally, the attribute information of each object included in the video data is stored in the storage device 31 in association with the masked video data. If the object included in the video data is a person, the attribute information may include at least one of gender, age, face angle, and facial expression. For example, as shown in FIG. 10, the identification information and attribute information of objects M1 to M4 included in the video data may be stored in association with the video data. In this case, the identification information of each object M1 to M4 may be displayed on the masked video data to be visually associated with a corresponding one of objects M1 to M4.

In step S21, the server 3 deletes the original video data from the storage device 31. For example, when the masked video data of store A is stored in the storage device 31, the original video data of store A may be deleted from the storage device 31. By deleting the original video data before masking processing from the server 3, the accumulated data volume in the server 3 can be optimally controlled, and the maintenance cost of the server 3 can be effectively reduced. However, the original video data may not be deleted immediately but instead retained for a certain period, depending on the user's cloud usage contract in terms of pricing, storage capacity, and duration.

Next, in step S22, the enterprise device 5 transmits a request for the video search screen 100 (see FIG. 13) to the server 3 in response to input operations by a staff of the AI development company K. Upon receiving the request, the server 3 transmits the video search screen 100 to the enterprise device 5 (step S23).

In step S24, the enterprise device 5 obtains information related to search conditions for the video data based on input operations by the staff of the AI development company K on the video search screen 100. The enterprise device 5 then transmits this search condition information to the server 3 (step S25).

As shown in FIG. 13, a search condition specification area 104 and a submit button 105 may be displayed on the video search screen 100. The search condition specification area 104 allows the user to specify search conditions such as video time (video capturing time), video data size, masking process type, types of objects included in the video, location where the video was captured, business type of location where the video was captured, region where the video was captured, time zone when the video was captured, and metadata availability. For example, after specifying the search conditions through the search condition specification area 104, the staff of the AI development company K can press the submit button 105, which prompts the enterprise device 5 to transmit the specified search condition information to the server 3.

Next, in step S26, the server 3 receives the search condition information for the video data from the enterprise device 5. Based on the received search condition information, the server 3 refers to the video management data stored in the storage device 31 and retrieves at least one masked video data file that matches the search conditions from multiple masked video data files stored in the storage device 31. More specifically, the server 3 refers to the video management data to identify the video data ID that matches the search conditions, and then retrieves the video data corresponding to the video data ID from the storage device 31.

The server 3 then transmits the retrieved masked video data (i.e., at least one masked video data file matching the search conditions) and the attribute information of the objects included in the retrieved video data to the enterprise device 5. In this way, the AI development company K, through input operations on the video search screen 100, can obtain the desired video data that meets the search conditions. More specifically, the AI development company K can retrieve the desired video data based on factors such as video capturing time, video data size, masking process information, types of objects included in the video data, video capture location, business type of location where the video was captured, region where the video was captured, time zone when the video was captured, and metadata associated with the video data.

When the masking process applied to the video data is mosaic processing or blurring processing, the attribute information of the objects has been removed from the masked video data. However, the attribute information of each object may be transmitted to the enterprise device 5 along with the video data. In this case, the presence of attribute information allows the masked video data to be effectively utilized as training data for constructing machine learning models related to human behavior.

Additionally, in step S26, before transmitting the retrieved masked video data that matches the search conditions to the enterprise device 5, the server 3 may first transmit a video list screen displaying a list of video data matching the search conditions to the enterprise device 5. In this case, the enterprise device 5, through staff input on the video list screen, transmits a request for the desired video data to the server 3. The server 3 then transmits the requested video data to the enterprise device 5 in response to the request.

On the other hand, if deep masking processing has been applied to the video data, the attribute information of each object remains in the masked video data, and the attribute information may not be transmitted to the enterprise device 5.

In step S27, the enterprise device 5 receives the masked video data and the attribute information of each object from the server 3. The AI development company K effectively utilizes the received video data as training data for constructing machine learning models (step S28).

According to this embodiment, the setting screen 60 for setting the masking process (i.e., anonymization of personal information) is displayed on the user device 4. The masking process is determined based on user input via the setting screen 60. Subsequently, the masking process is executed on the objects with personal information (e.g., people or vehicles) included in the video data, and the masked video data is provided to the enterprise device 5. In this way, the user U can determine which type of masking process should be applied to the video data through the setting screen 60, thereby improving the usability of the video provision system 1 in the context of video masking processing. Additionally, since the masked video data is provided to the enterprise device 5, the video data stored on the server 3 can be effectively utilized. For example, the masked video data can be effectively utilized as training data for constructing machine learning models (such as image recognition models using machine learning).

Furthermore, according to this embodiment, the video comparison screen 80 is displayed on the user device 4, and in response to user input on the user device 4, it is determined whether the masking process has been properly executed for the objects (e.g., people or vehicles) included in the video data. The masked video data is then provided to the enterprise device 5. In this way, the user U can confirm whether the masking process has been appropriately executed through the video comparison screen 80, thereby improving the usability of the video provision system 1 in the context of video masking processing. Furthermore, since the user U can objectively verify that the appropriate masking process, compliant with laws such as the Personal Information Protection Act, has been applied to the video data, sufficient transparency and reliability regarding the masking process can be ensured. As a result, the AI development company K, which receives the masked video data, can confidently utilize the video data as training data for constructing machine learning models.

Although the disclosure and examples have been fully described with reference to the accompanying figures, it should be noted that various changes and modifications will become apparent to persons skilled in the art. Such changes and modifications are to be understood as being included within the scope of the disclosure and examples as defined by the appended claims.

What is claimed is:

1. A video provision system which stores video captured by a camera on a server and provides the video to a device, the video provision system configured to:
    display a setting screen on a first device to allow a user to select at least one type of masking processing to be executed from a plurality of masking processing types, wherein the plurality of masking processing types include deep masking processing and at least one of blurring processing and mosaic processing, and wherein the deep masking processing removes personal information of a person in a first video while preserving attribute information of the person, including gender, age, and facial expression;
    determine the at least one type of masking processing to be executed, in response to user input via the setting screen;
    execute the determined type of masking processing on the person in the first video to generate a second video;
    store the second video on the server; and
    provide the second video from the server to a second device.

2. The video provision system of claim 1, further configured to:
    display a confirmation screen on the first device to verify whether the masking processing has been properly executed in the second video;
    determine whether the second video is available for use in response to user input via the confirmation screen; and
    store the second video on the server in response to determining that the second video is available for use.

3. The video provision system of claim 2, further configured to display the first video and the second video side by side on the confirmation screen.

4. The video provision system of claim 1, further configured to delete the first video after storing the second video.

5. The video provision system of claim 1, further configured to provide the attribute information and the second video.

6. The video provision system of claim 1, further configured to store metadata associated with the second video, wherein the metadata includes at least one of:
an identifier of the video;
a capturing time of the video;
a capture location of the video, and
the type of masking processing executed on the video.

7. The video provision system of claim 1, further configured to:
display a search screen on the second device to allow a user to search for a desired second video from a plurality of the second videos;
determine search conditions in response to user input via the search screen;
retrieve at least one second video that satisfies the determined search conditions from the second videos stored on the server; and
provide the retrieved second video to the second device.

8. The video provision system of claim 7, wherein the search conditions include at least one of:
video duration;
video data size;
type of masking processing executed on the video;
location where the video was captured;
business type of location where the video was captured;
region where the video was captured;
time period when the video was captured; and
metadata associated with the video.

9. A video provision system which stores video captured by a camera on a server and provides the video to a device, the video provision system configured to:
execute masking processing on a person in a first video to generate a second video;
store the second video on the server;
display a search screen on a second device to allow a user to search for a desired second video from a plurality of the second videos, wherein the search screen allows setting of at least one type of masking processing as a search condition from a plurality of masking processing types, wherein the plurality of masking processing types include deep masking processing, and wherein the deep masking processing removes personal information of a person in the first video while preserving attribute information of the person, including gender, age, and facial expression;
determine search conditions for the second video in response to user input via the search screen;
retrieve at least one second video that satisfies the determined search conditions from the second videos stored on the server; and
provide the retrieved second video to the second device.

10. The video provision system of claim 9, wherein the masking processing is executed on a face of the person in the first video.

11. A video provision method executed by a video provision system, wherein the video provision system is configured to store video captured by a camera on a server and provide the video to a device, the video provision method comprising:
displaying a setting screen on a first device to allow a user to select at least one type of masking processing to be executed from a plurality of masking processing types, wherein the plurality of masking processing types include deep masking processing and at least one of blurring processing and mosaic processing, and wherein the deep masking processing removes personal information of a person in a first video while preserving attribute information of the person, including gender, age, and facial expression;
determining the at least one type of masking processing to be executed, in response to user input via the setting screen;
executing the determined type of masking processing on the person in the first video to generate a second video;
storing the second video on the server; and
providing the second video from the server to a second device.

12. A non-transitory computer-readable medium having a video provision program stored thereon that causes a video provision system to perform the video provision method of claim 11.

13. The video provision system of claim 1, comprising:
the camera;
the server;
the first device; and
the second device,
wherein the camera, the first device, and the second device are communicably connected to the server via a communication network.

14. The video provision system of claim 9, comprising:
the camera;
the server;
the first device; and
the second device,
wherein the camera, the first device, and the second device are communicably connected to the server via a communication network.

\* \* \* \* \*